United States Patent
Zhou et al.

(10) Patent No.: US 8,682,680 B2
(45) Date of Patent: Mar. 25, 2014

(54) METHODS AND APPARATUSES FOR BIT STREAM DECODING IN MP3 DECODER

(75) Inventors: Jin Feng Zhou, Beijing (CN); David Gao, Beijing (CN)

(73) Assignee: Via Technologies, Inc., Taipei (TW)

( * ) Notice: Subject to any disclaimer, the term of this patent is extended or adjusted under 35 U.S.C. 154(b) by 1079 days.

(21) Appl. No.: 12/703,911

(22) Filed: Feb. 11, 2010

(65) Prior Publication Data

US 2010/0145714 A1 Jun. 10, 2010

Related U.S. Application Data

(62) Division of application No. 11/026,348, filed on Dec. 30, 2004, now Pat. No. 7,689,429.

(30) Foreign Application Priority Data

Jul. 28, 2004 (TW) .................. 93122516 A

(51) Int. Cl.
*G10L 19/16* (2013.01)
(52) U.S. Cl.
USPC ........................................................ 704/500
(58) Field of Classification Search
USPC ........................................................ 704/500
See application file for complete search history.

(56) References Cited

U.S. PATENT DOCUMENTS

| 6,199,039 B1 | 3/2001 | Chen et al. |
| 6,344,808 B1 | 2/2002 | Taruki |
| 6,466,476 B1 | 10/2002 | Wong |
| 7,107,111 B2 | 9/2006 | Van De Kerkhof et al. |
| 8,204,121 B2 * | 6/2012 | Feng et al. ............... 375/240.15 |
| 2002/0133764 A1 | 9/2002 | Wang |

FOREIGN PATENT DOCUMENTS

WO 0159603 A1 8/2001

* cited by examiner

*Primary Examiner* — Susan McFadden
(74) *Attorney, Agent, or Firm* — McClure, Qualey & Rodack, LLP

(57) ABSTRACT

A decoding method for MP3 bit streams, which replaces a buffer required in the decoding process by manipulating the order of data decoding. The decoding method includes reading the head and side information of the current frame, and calculating a main data's start address of the current frame. While decoding the main data, the head and side information of subsequent frames are skipped if the reading of the main data is not yet completed. The start address of the next frame is calculated and directly accessed after finished reading the main data of the current frame. An optimum method for accessing frequency lines utilizes the characteristics of the MP3 frequency line, instead of inserting a plurality of zeros in the rzero zone containing successive zeros, the initial boundary address of the rzero zone is memorized.

9 Claims, 9 Drawing Sheets

METHODS AND APPARATUSES FOR BIT STREAM DECODING IN MP3 DECODER

CROSS REFERENCE TO RELATED APPLICATIONS

This application is a Division of pending U.S. patent application Ser. No. 11/026,348, filed Dec. 30, 2004 and entitled "METHODS AND APPARATUSES FOR BIT STREAM DECODING IN MP3 DECODER", now U.S. Pat. No. 7,689,429, which is hereby incorporated by reference.

BACKGROUND

The invention relates to an MP3 decoder, and more specifically, to methods and apparatuses of bit stream decoding and memory optimization.

MP3, MPEG-1/AudioLayer-III, is a high compression digital audio format. An MP3 device decodes data stored in a digital storage media. Audio data is typically compressed in accordance with the features of the human auditory system. These features are typically referred to as volume, pitch, and masking effect. Volume is a measure of the strength of the sound. The hearing sensitivity of the human ear varies greatly with the frequency of the sound. A human for example, is more sensitive to audio signals with a frequency range between 2000 and 4000 Hz (2 KHz~4 KHz), whereas signals with a much lower or much higher frequency require a higher volume (or larger signal amplitude) to be heard. Pitch is generally measured in frequency, and the audible range is approximately from 20 Hz to 20 KHz. The masking effect is induced when a particular frequency band obstructs another frequency band. The masking effect can be generally divided into frequency masking and time masking.

An MP3 device decodes compressed data to recover the compressed digital signal restoring it to the original audio signal. FIG. 1 is a block diagram illustrating an MP3 decoder. A synchronizing and error checking module 100 receives audio digital data, wherein the digital data is carried by a bit stream 101 including a plurality of frames. The synchronizing and error checking module 100 performs authentication and decoding of the bit stream 101, searches for the start and finish address of each frame, and performs error checking. If an MP3 bit stream 101 contains self-defined auxiliary data 103, the module 100 outputs the auxiliary data 103 directly without decoding. Huffman decoding module 102, side information decoding module 104, and scale factor decoding module 106 decode corresponding information retrieved from the synchronizing and error checking module 100 respectively. Decoding modules 102, 104, and 106 are described in detail later. The decoded data is then passed to a re-quantization module 108. The function of the re-quantization module 108 includes reconstructing the frequency lines generated by the encoder. The function of the frequency line reorder module 110 includes examining if the sub-band comprises short windows. If short windows are present, the data order is reassembled according to the output order of the encoder. A stereo processing module 112 receives the frequency lines from the frequency reassembly module 110, and the stereo processing module 112 recovers the left and right audio signals from the encoded audio signal. The audio signal is divided into left and right channels, and is processed in parallel. The processing modules of the decoder include alias reconstruction modules 114a and 114b, IMDCT modules 116a and 116b, frequency inversion modules 118a and 118b, and combining multi-phase filters 120a and 120b. The alias reconstruction modules 114a and 114b reconstruct the audio signals through mixing to cancel the anti-alias effect induced in the encoder. The inverse modified discrete cosine transform (IMDCT) modules 116a and 116b transform the frequency lines into multiphase filter sub-band samples. The frequency inversion modules 118a and 118b compensate the frequency inversion by multiplying the samples of the odd sub-bands by −1. The combined multi-phase filters 120a and 120b calculate successive audio samples, and output the left channel 107 and right channel 105 respectively.

As shown in FIG. 2, a frame in the MP3 bit stream includes a header 200, a cyclic redundancy check (CRC) code 202, side information 204, a main data zone 206, and auxiliary data 208. The header 200 of the frame has 32 bits of data, which includes 12 synchronization bits. The synchronizing and error checking module 100 of FIG. 1 determines the position of each frame by searching the 12 synchronization bits, and detects errors according to the 16 bits CRC code. The side information 204 carries the information required for information selection and scale factor reconstruction by Huffman decoding. MP3 employs the bit reservoir technique, so that the side information 204 also includes the information for indicating the start position of the main data. The length of the side information is either 136 bits for a mono channel, or 256 bits for a stereo channel. The main data zone 206 includes the coded scale factor and data after Huffman encoding. The length of the main data in each frame is variable in accordance with the variable length Huffman code. If there is an available bit reservoir in the main data zone 206 of a frame, the main data of subsequent frames can be stored therein. In another aspect, the main data of a frame can be segmented into portions, which can be individually stored in the main data zone 206 of multiple frames. The start position of the main data can be determined by reading the bit index data in the side information 204. The main data zone 206 is divided into two granules, wherein a granule includes only one channel in a mono audio mode, and a granule includes two channels in a stereo mode. Each channel comprises a scale factor and Huffman code. The Huffman code in a channel corresponds to 576 frequency lines. The end of the frame is auxiliary data 208, and the format of the auxiliary data 208 is defined by the user. The MP3 decoder outputs the auxiliary data 208 without decoding or performing any data processing.

The length of the Huffman code is variable as previously mentioned, but the length of an MP3 frame is fixed. The MP3 frame allows the main data of a subsequent frame to be stored in the bit reservoir of a preceding frame. The side information of a frame includes 9 unsigned bits of main_data_end parameter indicating the start position of the main data in the current frame. The parameter main_data_end indicates the forward shift (in number of bytes) of the main data from the header of the current frame. If the parameter main_data_end exceeds the length of a frame, the header, CRC, and side information of the crossed preceding frames are not counted in the amount of forward shift. The shortest length of a frame is 96 bytes, thus the main data zone is at least 58 bytes as the data not counted in the shift amount is at most 38 bytes. The greatest value of the 9 bits main_data_end is 512, so that the maximum amount of shift is 512 bytes, which is equivalent to a forward shift of up to 9 frames.

Typically, an MP3 decoder requires a 7680 bit (960 bytes) first in first out (FIFO) buffer for storing the remaining decoded data of the current frame, wherein the remaining decoded data may be the main data of subsequent frames and the auxiliary data of the current frame. The decoder reads data from the bit stream when finished reading the data stored in the buffer. The operation of a decoder reading an MP3 bit stream 3 utilizing a buffer 36 is illustrated in FIG. 3. The decoder sequentially reads and decodes the bit stream 3 from the header 301 of frame 30. When the decoder reads the side information 302 of frame 30, the parameter main_data_end is 0, indicating that the main data 303 of frame 30 immediately follows the side information 302. Decoding of the main data 303 of frame 30 is completed when the decoder decodes data to point A, the remaining data 304-307 of frame 30 are written to the buffer 36. The decoder then reads the header 321 and the side information 322 of frame 32 from the bit stream 3. The parameter main_data_end of frame 32 refers to point B, indicating that the main data 305 of frame 32 is at point B in frame 30. Point B reflects to the buffer 36 as shown by the dashed line in FIG. 3. Data between point A and point B is the auxiliary data 304. The decoder then reads the data from the buffer 36, and determines of reading of the main data 305 of frame 32 is complete upon reaching point C. Some data from frame 30 and the remaining data 323 of frame 32 will remain in the buffer 36. The decoder then reads the header 341 and the side information 342 of frame 34 from the bit stream 3. The parameter main_data_end of frame 34 refers to point D, and since point D is reflected to the buffer 36, the decoder will read the data from the buffer 36. The decoder finishes reading the buffer 36 upon reaching point E, and reads data from the bit stream 3 until reaching point F. The decoder thus reads the main data 307, 323, 343 of frame 34, the remaining data of frame 34 is stored in the buffer 36, and the data decoding is processed in the same way as previously described.

It can be seen from the previous description that the data stored in the buffer requires an extra writing operation (writing to the buffer) compared to data not stored in the buffer, as well as an extra reading operation (reading from the buffer).

After Huffman decoding the main data of the MP3 bit stream, frequency lines representing strength of the compressed audio in each frequency are retrieved. A set of 576 frequency lines can be generally divided into three zones, from low frequency to high frequency, the three zones includes a first zone (usually referred to as big-values) 40, a second zone (usually referred to as count1) 42, and a third zone (usually referred to as rzero) 44. The boundaries of the three zones are designated by the side information. Humans are more sensitive to sound with a frequency range from 2 KHz to 4 KHz, typically referred to as low frequency in the audible range, thus the corresponding zone (big-values) 40 usually contain large values. High frequency audio is not easily heard by the human ear, thus successive zero values are present in the high frequency zone (rzero) 44.

During Huffman decoding, the boundary of rzero zone 44 is determined and the decoder inserts the appropriate number (r) of zeros in the rzero zone 44. The data processing after Huffman decoding, such as re-quantization, stereo processing, alias reconstruction, IMDCT, however, require an additional r reading operations and r writing operations, thus suffers decoding inefficiency.

SUMMARY

Embodiments of the invention provide decoding methods for MP3 bit streams, which replace a buffer required in the conventional decoding process by manipulating the order of accessing data in the MP3 decoding process. FIG. 5 is a flow chart illustrating the decoding method for MP3 bit streams according to an embodiment of the invention, comprising reading and decoding the header and side information of a current frame, and calculating a start position of the main data of the current frame according to a main_data_end parameter in the side information. While obtaining the start position, the decoding method further comprises directly accessing and decoding the main data according to the calculated start position of the main frame, wherein the header and side information of other frames are skipped when the decoding process of the main data is not yet complete, and calculating and directly accessing a start address of the subsequent frame when finished decoding the main data.

In the decoding process, the start position of the main data is calculated by forward shifting the start address of the current frame according to an offset. The offset is a 9 bit unsigned main_data_end parameter. The offset for address calculation does not count the lengths of the header, cyclic redundancy check (CRC), and side information. The frames in the bit stream may include auxiliary data, wherein the format of the auxiliary data can be defined by the user. The decoder outputs the auxiliary data without processing or decoding. If the current frame contains auxiliary data, the decoder reads the auxiliary data of a preceding frame before decoding the main frame of the current frame.

In an aspect of an embodiment of the invention, a method of storing relevant information such as the frame start address, finish position of the main data, and representative length value is provided for address calculation during MP3 decoding. The representative length value contains two bits for indicating the length of a corresponding frame. The representative length value is for deriving the length of the side information, wherein one bit of the representative length value indicates whether the corresponding frame comprises a CRC field, and another bit indicates whether the MP3 bit stream is for a mono or stereo channel.

In an embodiment of the invention, a decoder for decoding MP3 bit streams is provided to execute the decoding method. FIG. 6 is a block diagram illustrating an MP3 decoder comprising a decoder 62, an address calculating unit 64, and a memory 66. The decoder 62 in the MP3 decoder reads and decodes an MP3 bit stream 60. The address calculating unit calculates reading addresses for the decoder 62, and the memory 66 stores the information required by the address calculating unit 64 while computing the reading addresses.

A memory optimization method for a frequency line storage unit according to another embodiment of the invention is provided to reduce the number of reading and writing operations during MP3 decoding. 576 frequency lines stored in a storage unit are read by the decoder sequentially, and upon detecting that a frequency line address exceeds a predetermined zero boundary address, the reading operation is terminated. The number of reading, writing, and calculating operations for the frequency lines after Huffman decoding performed in the MP3 decoder can thus be significantly reduced. In an embodiment of the invention, the memory optimization method for reducing the number of memory accessing operations is implemented in a re-quantization module, stereo processing module, alias reconstruction module, or an IMDCT module in the MP3 decoder. The computation load of these modules can also be alleviated when implementing the memory optimization method.

A device reducing the reading and writing operations for a MP3 decoder is also provided. The device comprises a storage unit storing 576 frequency lines, and a control unit. The control unit detects whether the address of each frequency line exceeds a zero boundary address, and immediately terminates the reading operation if the address exceeds the zero boundary address.

DESCRIPTION OF THE DRAWINGS

The invention can be more fully understood by reading the subsequent detailed description in conjunction with the examples and references made to the accompanying drawings, wherein.

DETAILED DESCRIPTION

Figure 7:
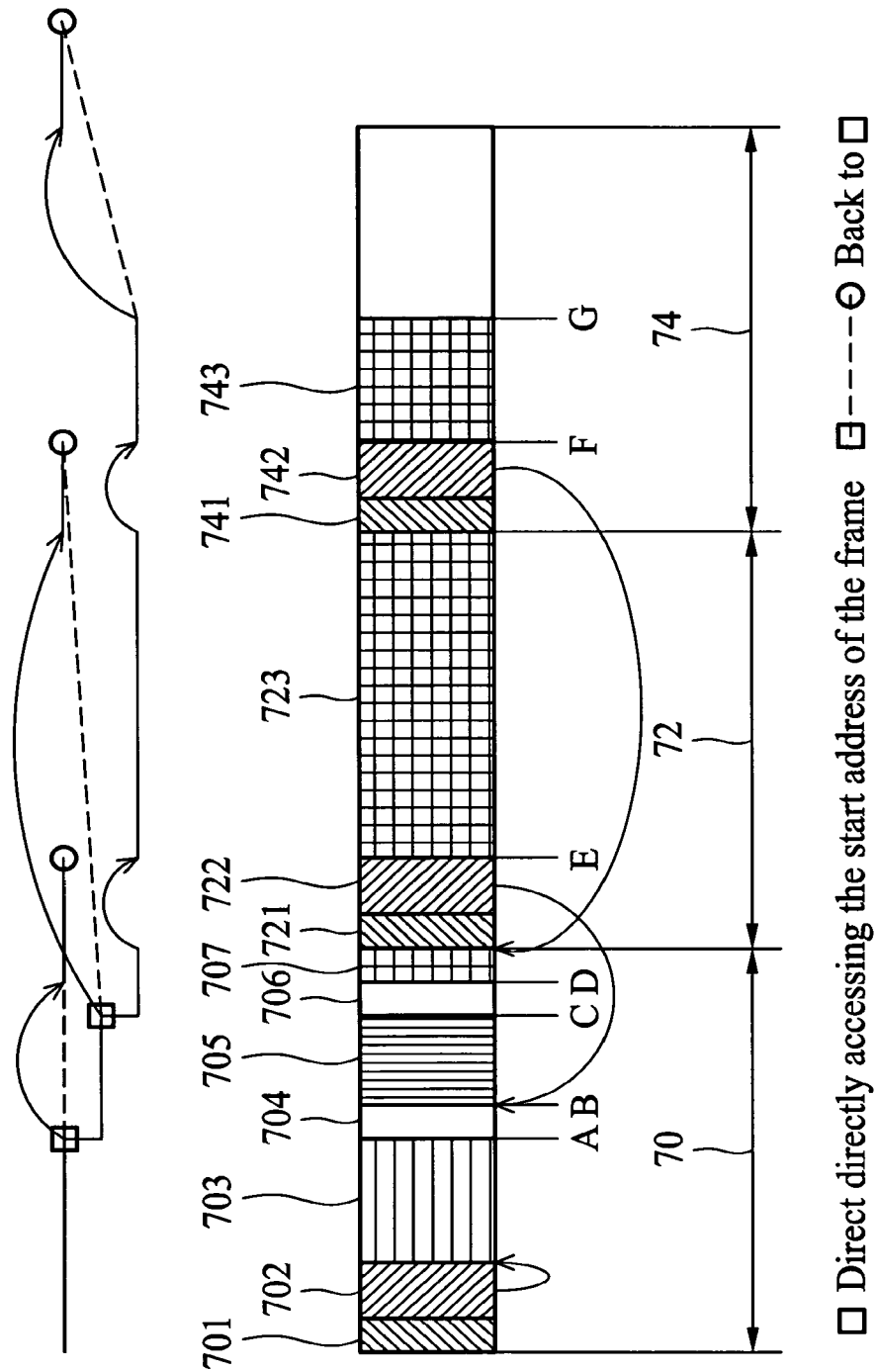
FIG. 7 shows an example of MP3 decoding method replacing the buffer by manipulating the order of decoding.

FIG. 7 shows an example illustrating the MP3 decoding procedures according to an embodiment of the invention. The MP3 bit stream is similar to the MP3 bit stream of FIG. 3, and Algorithm A is an exemplary algorithm for calculating the start position of the main data.

Algorithm A:

```
for frame=current_frame to last_frame+1 do
        frame_net_length=frame_header_addr[frame]-
frame_header_addr[frame-1]-hcs[frame-1];
        if frame_net_length>main_data_end
                main_data_begin=frame_header_addr[frame]-
                main_data_end;
                break;
        else
                main_data_end=main_data_end-frame_net_length;
        end if
        if frame==last_frame
                err_ind[frame]=1;
                break;
        end if
end for
```

Figure 3:
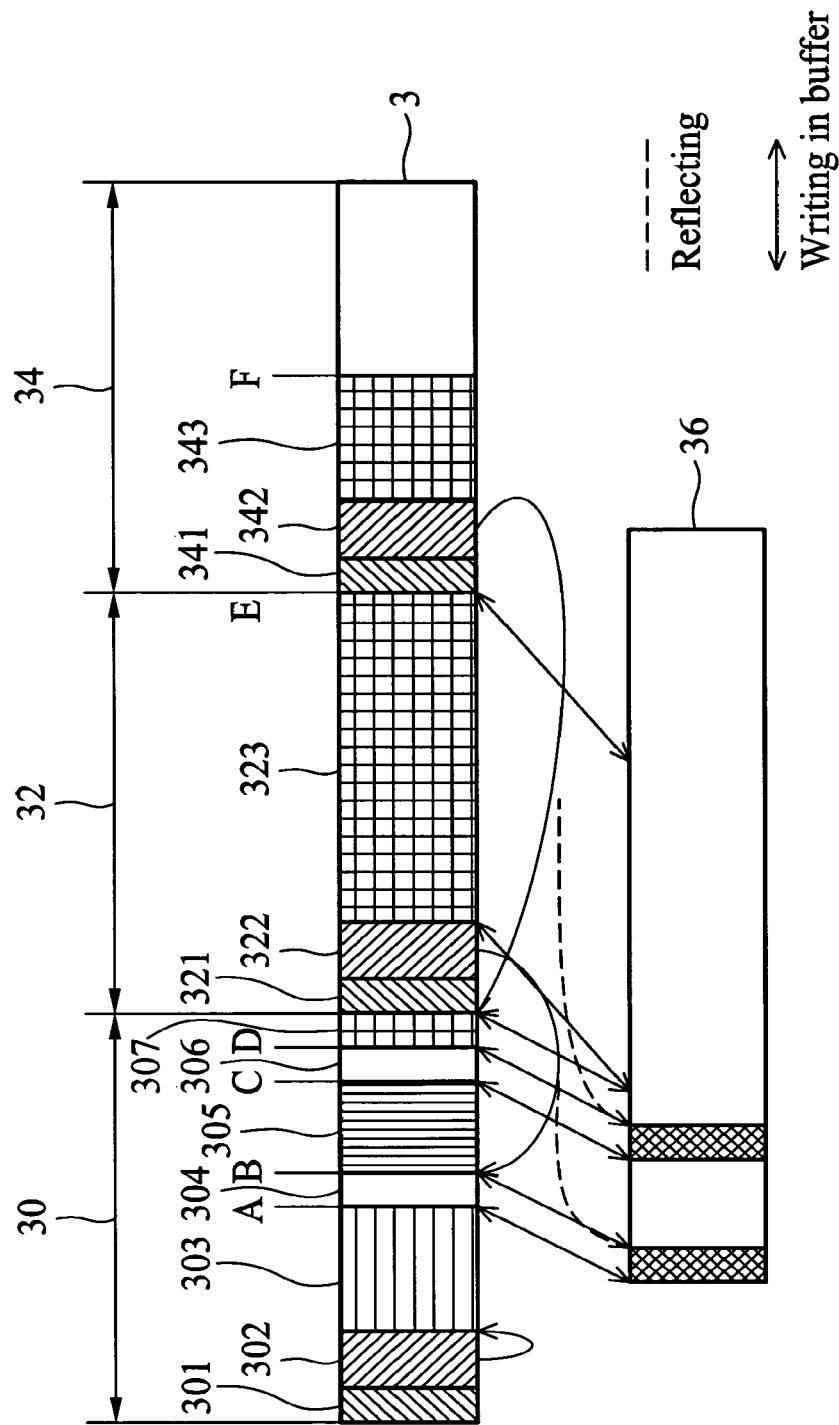
FIG. 3 shows an MP3 decoding method employing a buffer.

The example shown in FIG. 7 is described using the same example as shown in FIG. 3, and the decoding procedures are described in the following.

An MP3 decoder begins reading and decoding the MP3 bit stream from the header 701 of frame 70. While the MP3 decoder finishes decoding, the decoder 62 determines that the main_data_end parameter in the side information 702 in frame 70 is zero, indicating that no main data 703 is stored in the bit reservoir of any frame. After decoding the side information 702, the MP3 decoder continues decoding the main data 703 of frame 70. When the MP3 decoder decodes the data at point A, the decoder knows the main data 703 of frame 70 is complete according to a finish position of the data stored in a memory, and finally directly accesses the header 721 and side information 722 of frame 72 according to the start address of a subsequent frame 72.

The data format of an MP3 frame is predefined, and only two parts thereof have variable data length, each with two possible data lengths. These two parts are cyclic redundancy check (CRC) and side information. An MP3 frame can selectively contain a 16 bit CRC field, and the data length of the side information can be either 136 bits (mono channel) or 256 bits (stereo channel). A 2 bit representative length value for each frame is stored in the memory in order to determine the length of the frame.

After the decoder decodes the main data 703 of frame 70, the address calculating unit computes the start address of frame 72 by adding the length of the frame to the start address of frame 70. The decoder thus reads and decodes the header 721 of frame 72 when the address calculating unit computes the start address of frame 72. The main_data_end parameter in the side information 722 of frame 72 points to point B, thus the decoder directly reads point A after decoding the side information 722 of frame 72 (point E), in order to decode the auxiliary data 704 of frame 70 and the main data 705 of frame 72. The address of point B is calculated by the address calculating unit according to the main_data_end parameter and the relevant information stored in the memory.

Similarly, the decoder detects point C is the end of the main data 705, and calculates the start address of frame 74 according to the address calculating unit and the information stored in the memory. As a result, the decoder directly accesses the start of frame 74 to decode the header 741 and side information 742 of frame 74 when decoding the data at point C. The decoder is capable of calculating that the main data 707, 723, and 743 of frame 74 is stored in the MP3 bit stream from point D, thus the decoder directly accesses point C after decoding the side information 742 of frame 74 (point F) to decode the auxiliary data 706 of frame 72 and the main data 707 of frame 74. When the decoder decodes the header 721 of frame 72, the address of point E can be calculated since the length of the side information 722 of frame 72 can be determined by the representative length value stored in the memory. The decoder then skips the header 721 and side information 722 of frame 72 and directly accesses point E to decode the remaining main data 723 of frame 74.

The decoder skips the header 741 and side information 742 of frame 74 when reading the header 741 of frame 74, and directly accesses point F to decode the remaining main data 743 of frame 74. From the main_data_end parameter, the finish position of the main data 707, 723, and 743 of frame 74 is determined as point G, thus the decoder directly accesses the start address of a subsequent frame when decoding data at point G. The decoder begins decoding the subsequent frame by decoding the header and side information. The decoding procedure is performed as previously described.

The decoding method manipulates the decoding order by calculating corresponding addresses during decoding, and as a result, the FIFO buffer typically required by the decoder is omitted. The information required for address calculation corresponding to a particular frame comprises the start address of the frame, the finish position of the main data, and the length representation value. According to the MP3 frame format, the address of a frame is represented by 26 bits, thus there are 64 million addresses ($2^{26}$ bits=64 Mbytes). The representative length value contains 2 bits, one bit differentiates whether the frame carries a 16 bit (2 byte) CRC, and another bit indicates whether the side information carries 136 bits (17 bytes) or 256 bits (32 bytes) of data.

The main_data_end parameter in algorithm A is a 9 bit unsigned value with a maximum value of 511, the minimum length of a frame is 96 bytes. The minimum length of the main data is 58 bytes since the header is 4 bytes, CRC is 2 bytes, and the maximum side information is 32 bytes (96−4−2−32=58). The main_data_end parameter can point to at most 9 frames prior to the current frame, which means that the start position of the main data can be stored at that location (511/58=9).

In order to calculate the star position of the main data of a current frame, the memory stores the start address and the corresponding representative length value of the current frame and 9 previous frames. The memory only requires storage of the finish position of the main data while decoding the current frame. Therefore, the memory stores a total of 10*(26+2)+26=306 bits of data. The FIFO buffer typically required by the MP3 decoder is around 7680 bits, and in comparison, the memory only requires 4% of the buffer capacity. The memory according to an embodiment of the invention can also employ a FIFO scheme for storing the addresses and the representative length values.

Figure 8:
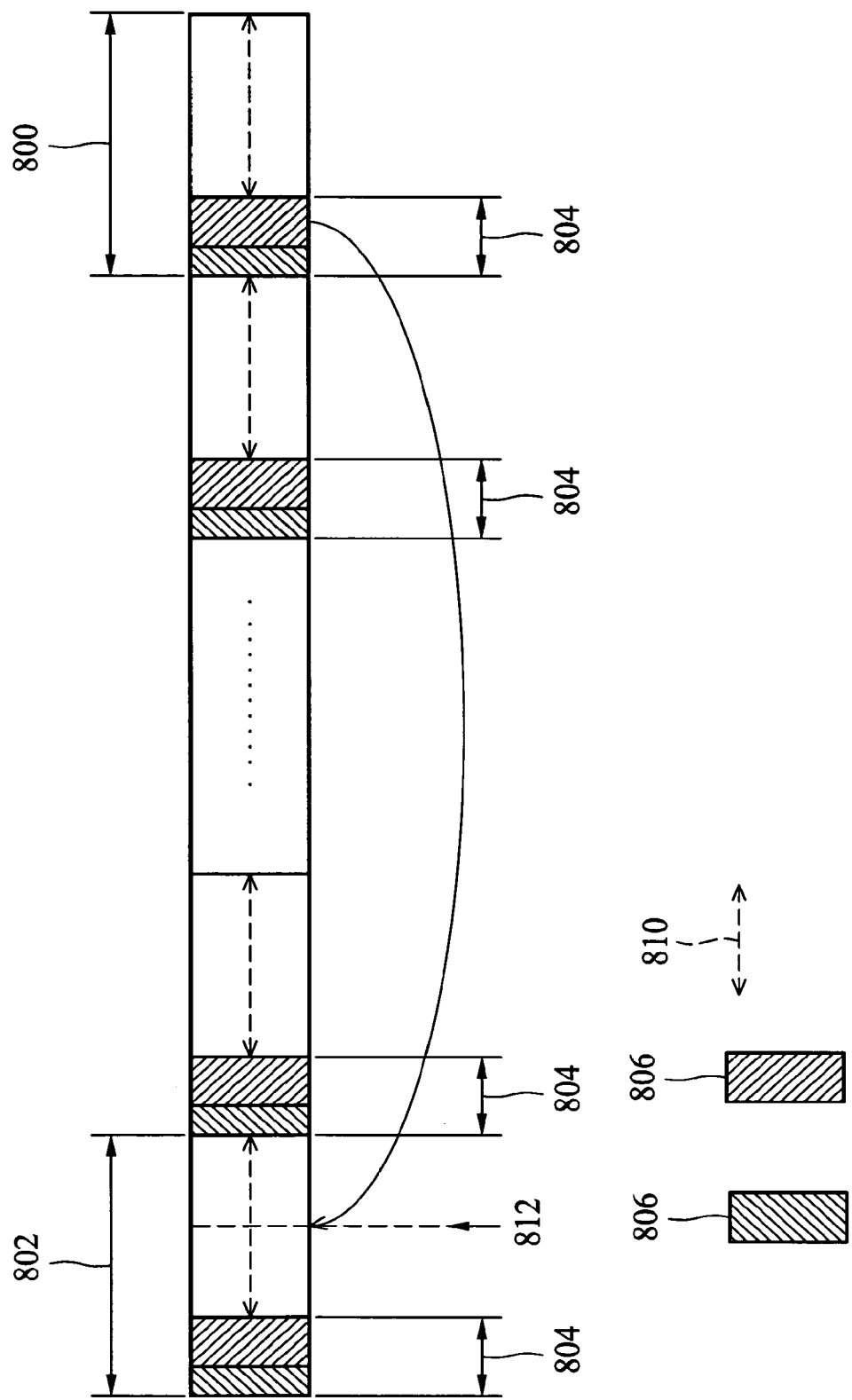
FIG. 8 illustrates a method of calculating the start position of the main data according to an embodiment of the invention.

The start position of the main data is calculated and derived according to the information stored in the memory and the main_data_end parameter of the side information. Algorithm A and FIG. 8 illustrates the procedures for calculating the start position of the main data. The current_frame 800 indicates the frame currently decoded by the decoder, and last_frame 802 indicates the ninth frame forward shifting from the current_frame, which is the earliest frame stored in the memory for current frame calculation. Hcs represents the total length of header 806, CRC, and side information 808, and Hcs is derived from the 2 bit representative length value stored in the memory. Frame_net_length 810 represents the main data length of the frame, and main_data_begin 812 represents the start position of the main data corresponding to the current frame. If there is still no positive result after calculating the earliest frame stored in the memory, decoding of the current frame is abandoned. When this occurs, the decoder outputs an err_ind indicating a decoding error and starts decoding the subsequent frame.

Figure 1:
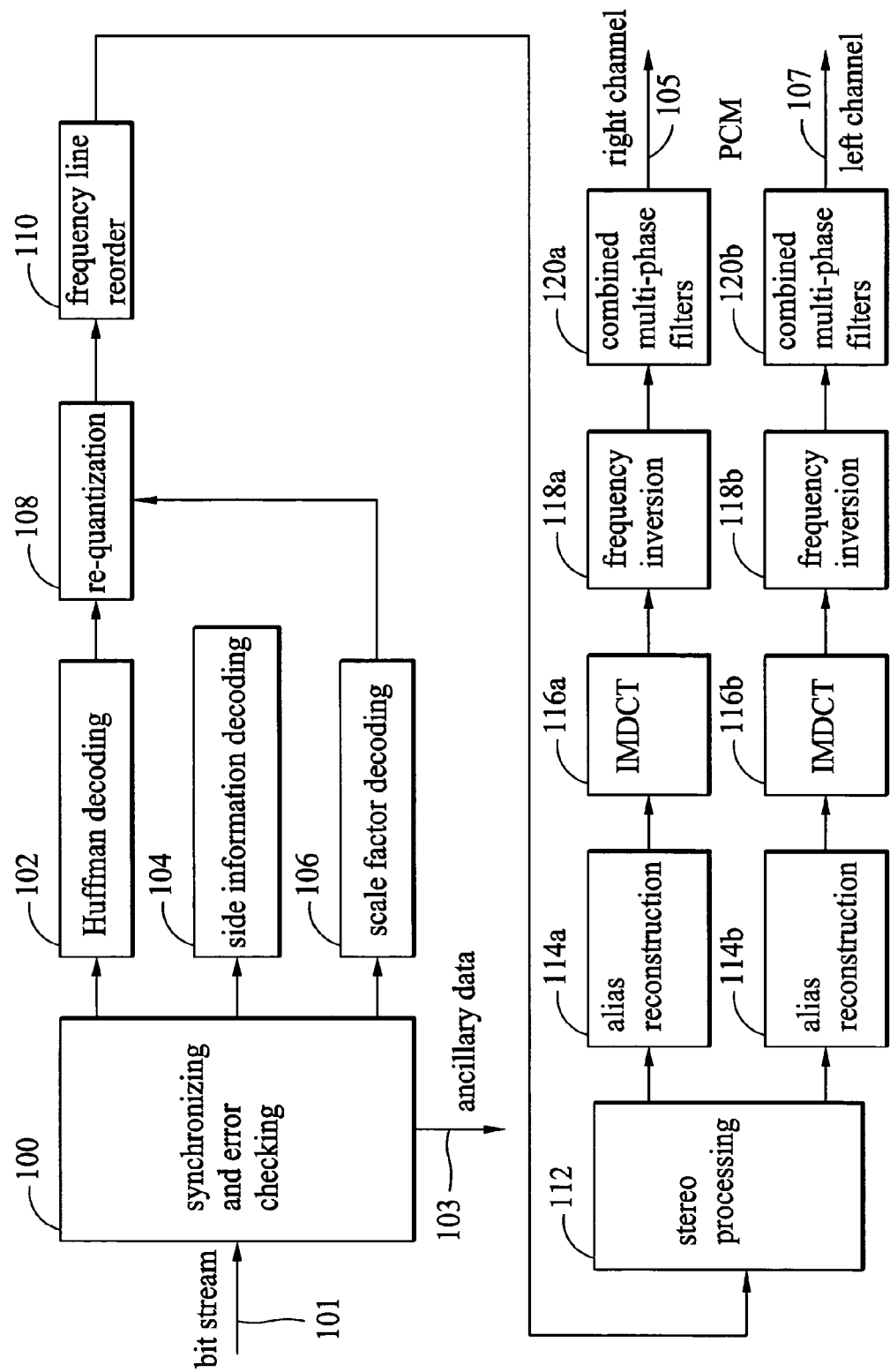
FIG. 1 shows the functional blocks in an MP3 decoder.
Figure 2:
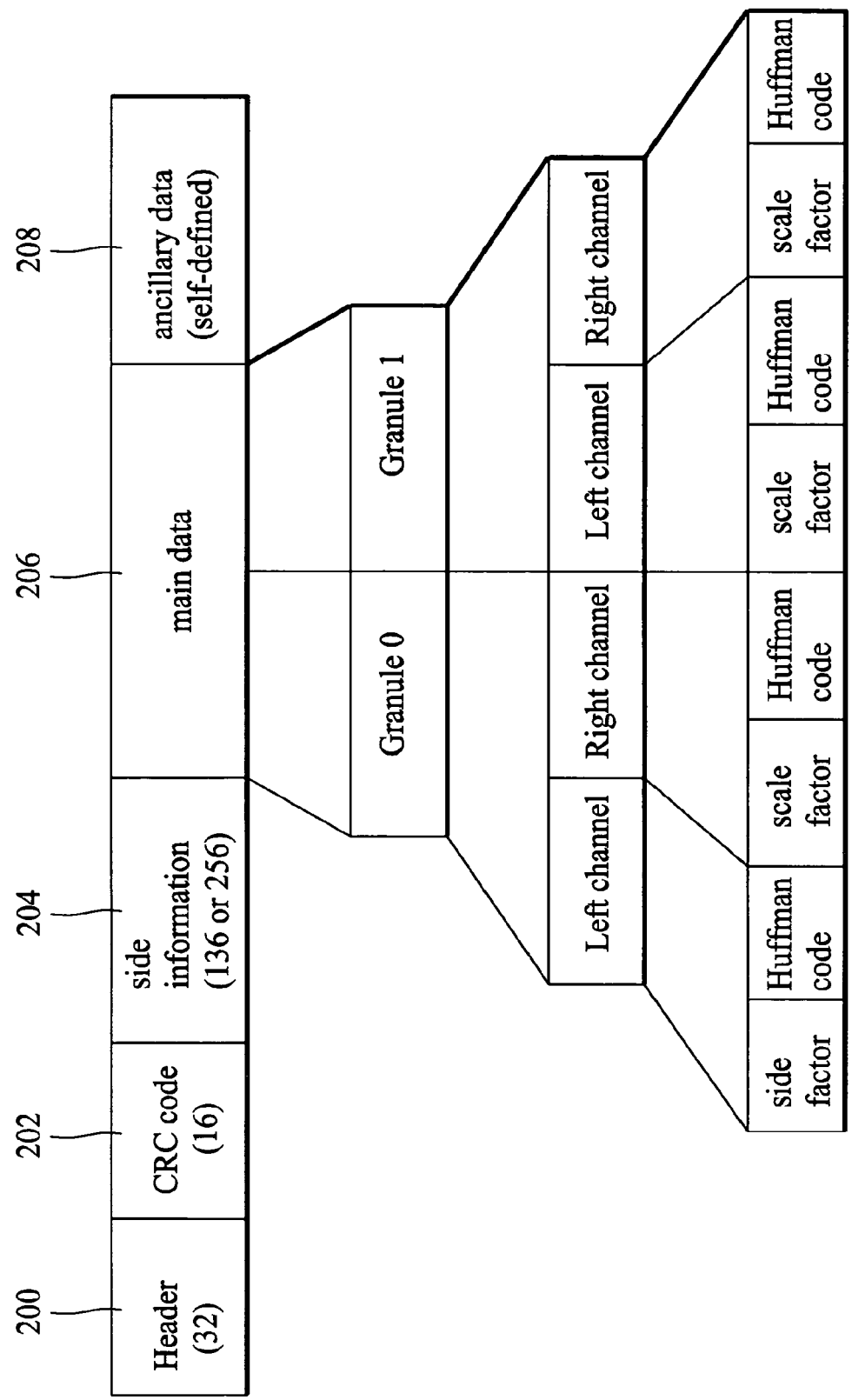
FIG. 2 shows a data structure of an MP3 frame.
Figure 6:
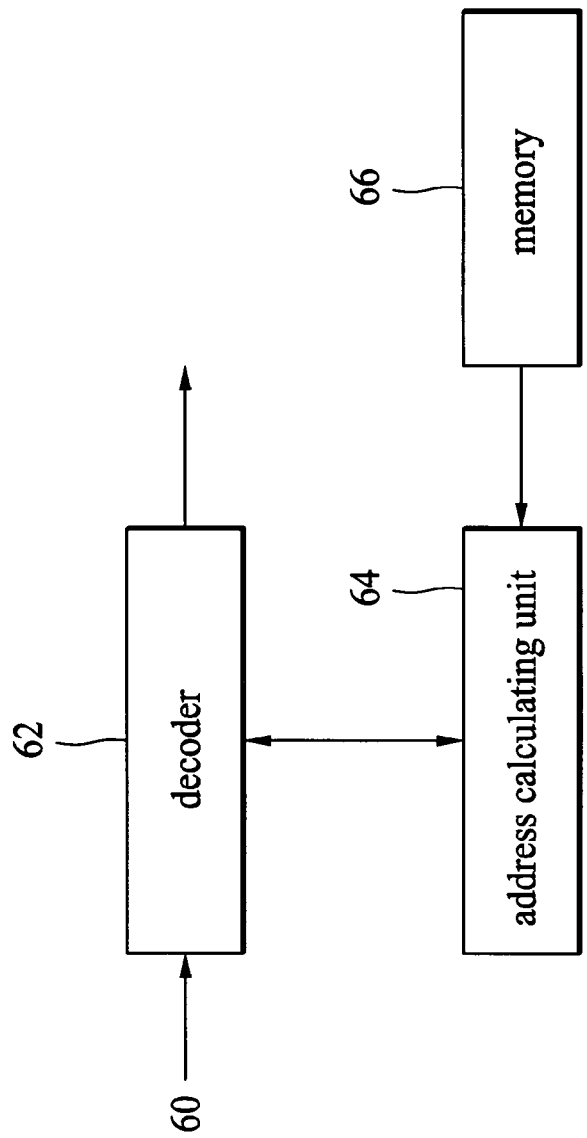
FIG. 6 is a block diagram illustrating an MP3 decoder according to an embodiment of the invention.

In FIG. 6, the MP3 decoder comprises a decoder 62, an address calculating unit 64, and a memory 66, can be implemented in the synchronizing and error checking module 100 in FIG. 1. The MP3 decoder categorizes the received MP3 bit stream, and retrieves only the main data for Huffman decoding to restore the digital audio data.

The MP3 decoding method and decoder requires only 4% of the memory capacity used in the prior FIFO buffer, the memory size and the area of the integrated circuit such as VLSI for realizing the MP3 decoder can thus be further reduced. The MP3 decoding method is also a low power solution since the number of reading and writing operations is reduced compared to the decoder required by a FIFO buffer. Typically, 80% of the MP3 main data is stored in the bit reservoir of other frames, therefore the provided method may be very efficient in power reduction.

Figure 4:
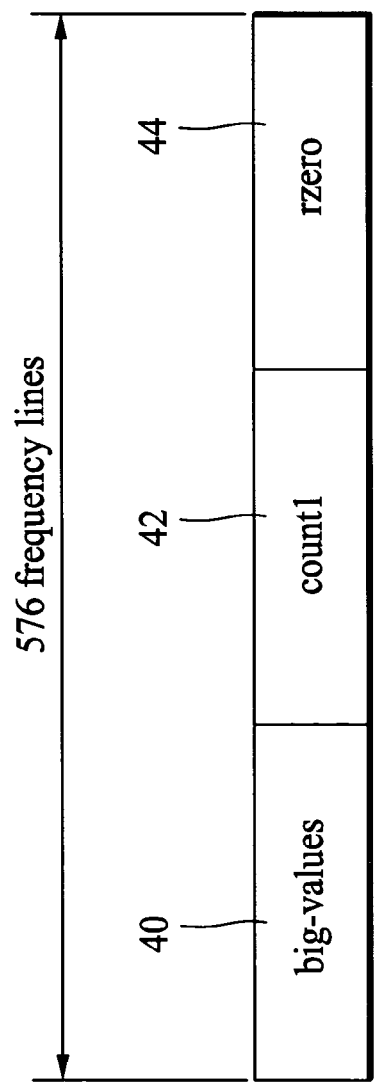
FIG. 4 shows a structure of MP3 frequency lines.
Figure 5:
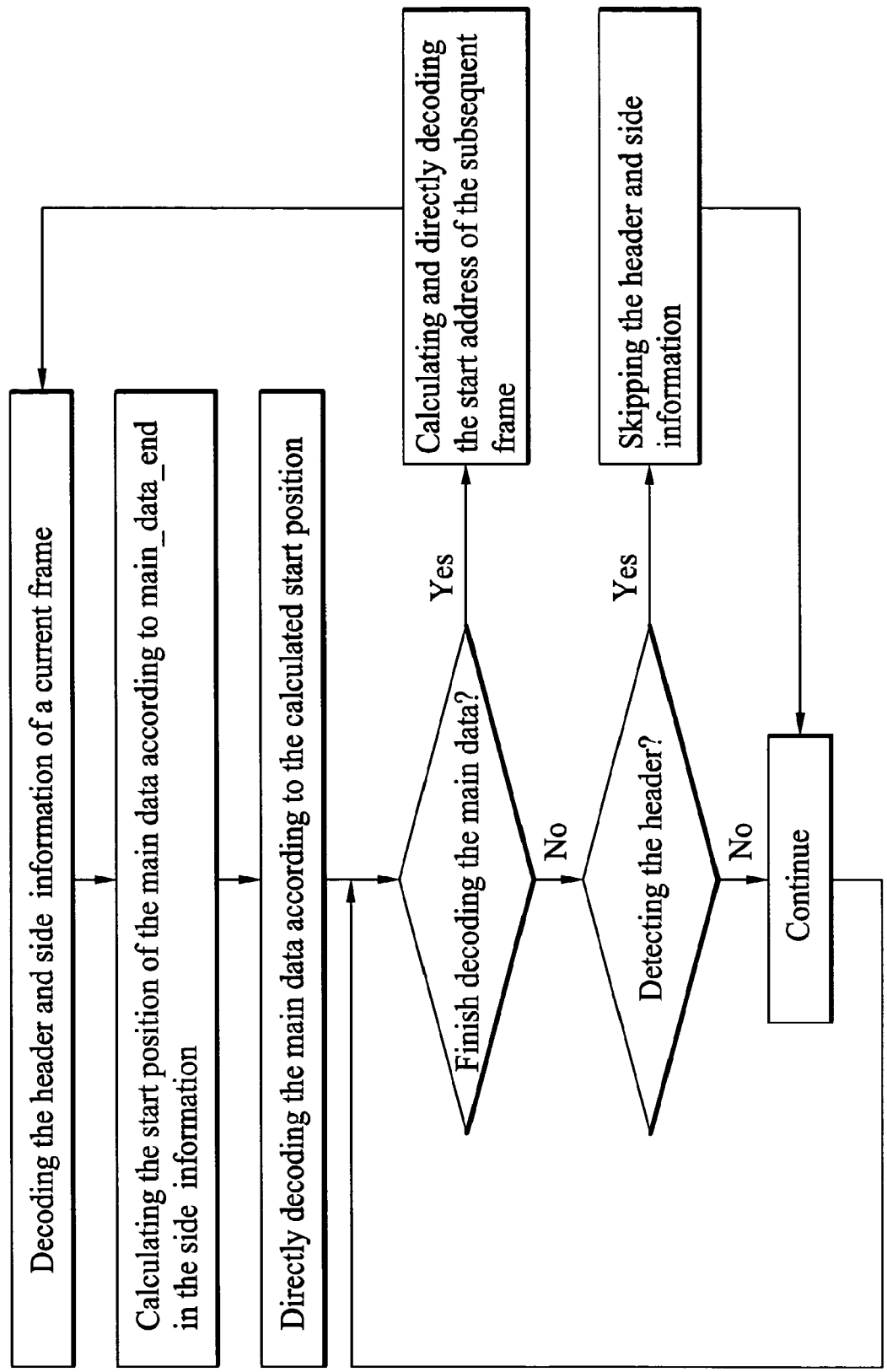
FIG. 5 is a flowchart illustrating an MP3 decoding method according to an embodiment of the invention.

In an embodiment of the invention, a memory optimization method is achieved according to the specific characteristic of the 576 frequency lines as shown in FIG. 4. In a hardware implementation, the high frequency rzero zone 44 containing consecutive zeros are treated specially. Since the values of the frequency lines in rzero zone 44 are all zero, unnecessary reading and writing operations can be omitted by detecting the boundary between count1 42 and rzero 44 zones (zero boundary).

The conventional Huffman decoding method comprises inserting a plurality of zeros for the frequency lines in rzero zone 44 after decoding the frequency lines in big-values 40 and count1 42 zones. Some embodiments of the invention omit unnecessary reading or writing operations by comparing each reading/writing address of a frequency line (read_addr) to the address of the zero boundary (zero_addr).

The reading or writing operation can be terminated when the reading or writing frequency line address exceeds the zero_addr. As a result, the number of times accessing the frequency line storage unit is reduced as writing/reading a plurality of zeros the frequency lines in rzero zone 44 is not required for the rzero zone. Assuming rzero zone 44 comprises r frequency lines, the system requires r writing operations if the system processes rzero zone 44 in the same way as it processes the other two zones 40 and 42. Similarly, the system requires r reading operations for rzero zone 44 when acquiring frequency line values from the frequency line storage unit. The initial boundary of rzero zone 44 (zero_addr) is memorized so that the repeated insertion of zeros can be omitted which reduces the number of r writing operations when storing the frequency lines in the memory, and reduces the number of r reading operations when reading the frequency lines from the memory.

Figure 9:
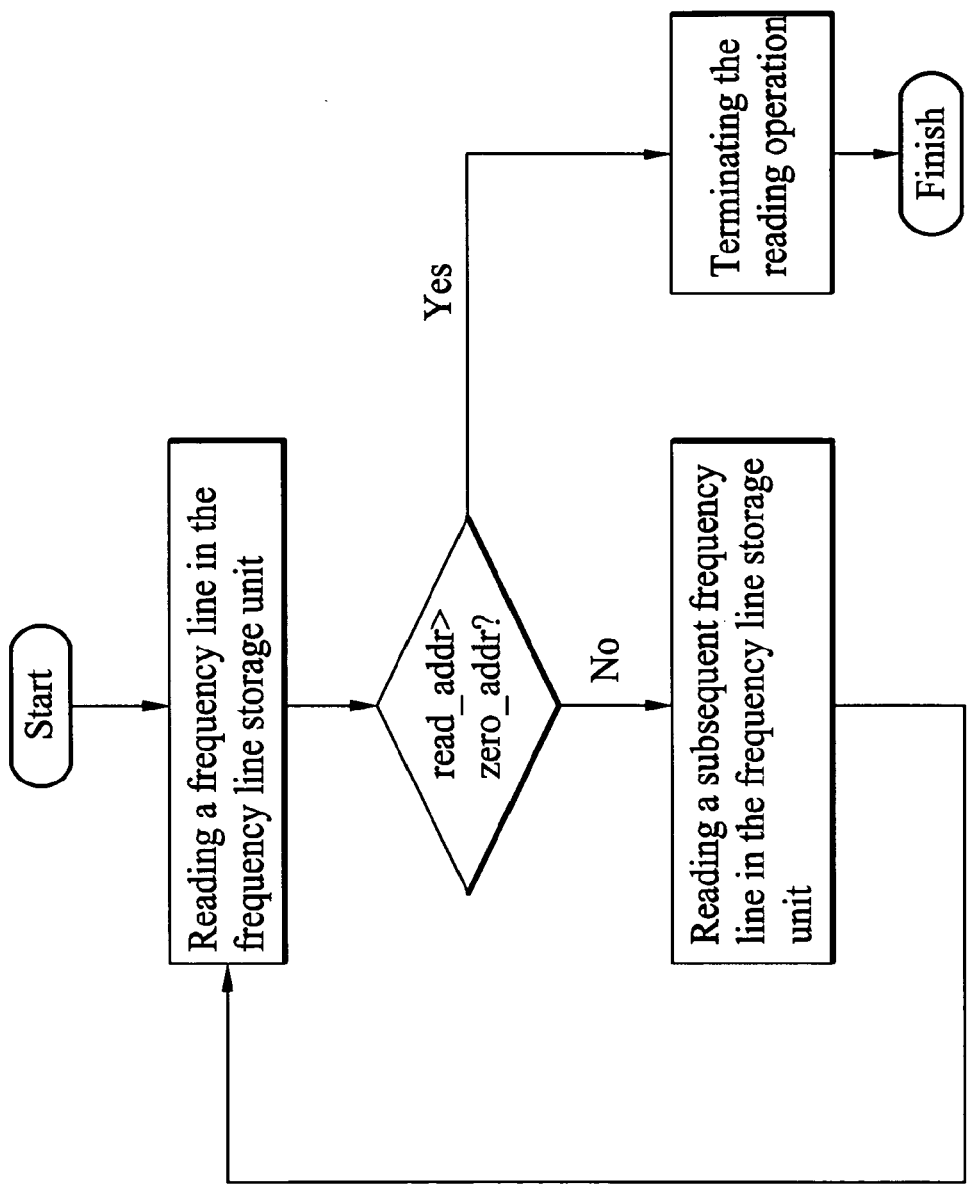
FIG. 9 is a flowchart illustrating an optimum method for accessing the frequency lines according to an embodiment of the invention.

The Huffman decoding module or the alias reconstruction module in the MP3 decoder can update the value of zero_addr. The flowchart shown in FIG. 9 illustrates the process of reading values from a frequency line storage unit performed in a module in the MP3 decoder according to some embodiments of the invention. Examples of the module in FIG. 9 include the re-quantization module, stereo processing module, alias reconstruction module, and the IMDCT module. The module determines if reading the value of a subsequent frequency line is necessary by comparing the current frequency line reading address (read_addr) to the initial boundary of rzero zone (zero_addr). The module stops reading the value of the subsequent frequency line when read_addr exceeds zero_addr. The computation amount of the module is therefore reduced. The values in rzero zone are still zeros after computation, and thus it is reasonable to neglect the rzero zone during computation.

The memory optimization method according to embodiments of the invention can be implemented in modules of the MP3 decoder utilizing a frequency line storage unit and a control unit. The frequency line storage unit stores 576 frequency lines, and the control unit terminates the reading/writing operation when detection of the current reading/writing frequency line address exceeds the boundary address of rzero zone.

Typically, the rzero zone contains around 202 frequency lines after Huffman decoding, which is about a third of the total frequency lines. The memory optimization method and the corresponding MP3 decoder according to embodiments of the invention may potentially reduce the number of reading and writing operations by about ⅓. Furthermore, methods of embodiments of the invention can be implemented in MP3 decoders by modifying the programming of the MP3 decoders.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of memory optimization, implemented in modules of an MP3 decoder, comprising:
   reading a storage unit comprising a plurality of frequency lines;
   detecting whether an address of each frequency line exceeds a zero boundary address; and
   terminating reading of the frequency line storage unit if a frequency address exceeds the zero boundary address.

2. The method according to claim 1, wherein there are 576 frequency lines.

3. The method according to claim 1, wherein the method is implemented in a processing module coupled to the output of a Huffman decoding module.

4. The method according to claim 3, wherein the processing module is a re-quantization module.

5. The method according to claim 3, wherein the module is a stereo processing module.

6. The method according to claim 3, wherein the module is an alias reconstruction module.

7. The method according to claim 6, wherein the value of the zero boundary address is updated in the alias reconstruction module.

8. The method according to claim 3, wherein the module is an inverse modified discrete cosine transform (IMDCT) module.

9. The method according to claim 3, wherein the value of the zero boundary address is updated in the Huffman decoding module.

* * * * *